United States Patent [19]
Rokutan

[11] Patent Number: 5,228,018
[45] Date of Patent: Jul. 13, 1993

[54] OPTICAL INFORMATION RECORDING/REPRODUCING APPARATUS WITH TRACKING OFF-SET CORRECTION

[75] Inventor: Takao Rokutan, Tokyo, Japan

[73] Assignee: Olympus Optical Co., Ltd., Tokyo, Japan

[21] Appl. No.: 731,858

[22] Filed: Jun. 21, 1991

[30] Foreign Application Priority Data

Jun. 25, 1990 [JP] Japan .................................. 2-164006

[51] Int. Cl.⁵ .............................................. G11B 7/00
[52] U.S. Cl. ................................................. 369/44.29
[58] Field of Search ................ 369/44.27, 44.28, 44.29, 369/44.31

[56] References Cited

U.S. PATENT DOCUMENTS 4,769,803  9/1988  Yamamiya ..................... 369/44.28
5,121,373  6/1992  Barton et al. ................... 369/44.28

FOREIGN PATENT DOCUMENTS 1-201831  8/1989  Japan .

*Primary Examiner*—Donald E. McElheny, Jr.
*Attorney, Agent, or Firm*—Stevens, Davis, Miller & Mosher

[57] ABSTRACT

An optical information recording/reproducing apparatus in which a deviation of a neutral position of an objective lens from a reference position in a tracking direction is detected as an off-set signal and the position of the objective lens is controlled on the basis of the thus detected deviation such that that the neutral position of the objective lens is coincident with the reference position before a tracking servo operation is initiated. The deviation of the neutral position of the objective lens from the reference position in the range at which the objective lens is moved under the tracking servo control system is corrected. Therefore, even if the apparatus is set in an inclined manner, the tracking servo operation and the other desired operations conducted on the basis of the off-set signal can be always conducted in a stable manner.

7 Claims, 7 Drawing Sheets

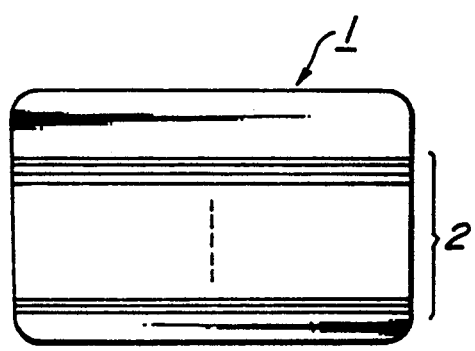
FIG_1
PRIOR ART
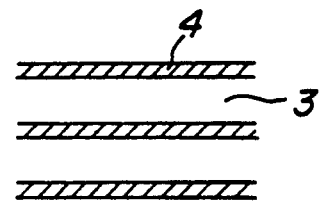
FIG_2
PRIOR ART
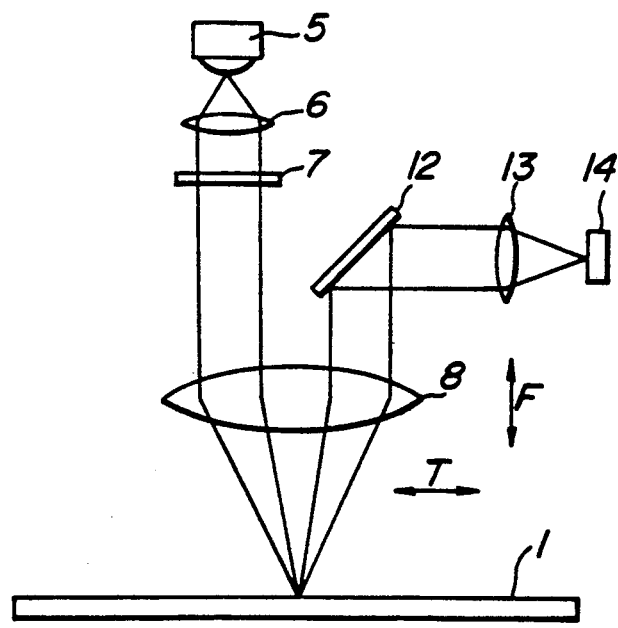
FIG_3
PRIOR ART

FIG_4
PRIOR ART
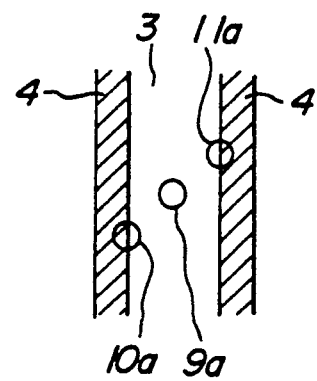
FIG_5
PRIOR ART
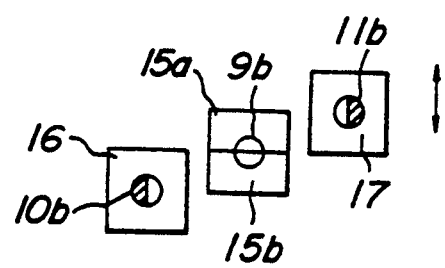

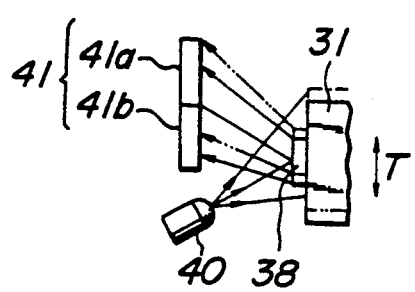
FIG._9A
PRIOR ART
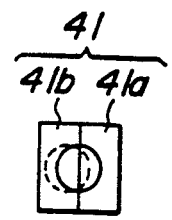
FIG._9B
PRIOR ART
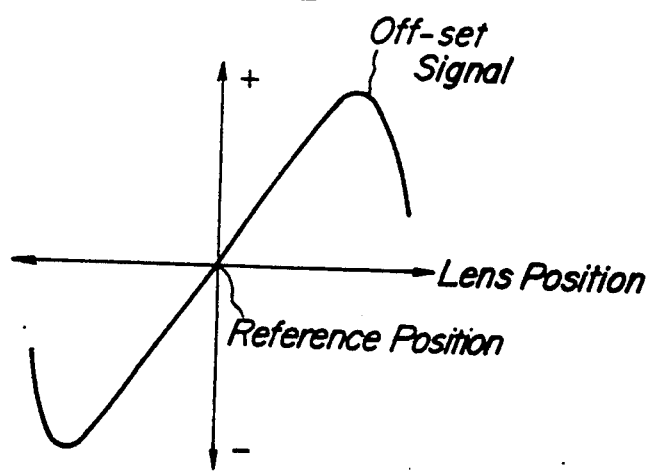
FIG._10
PRIOR ART

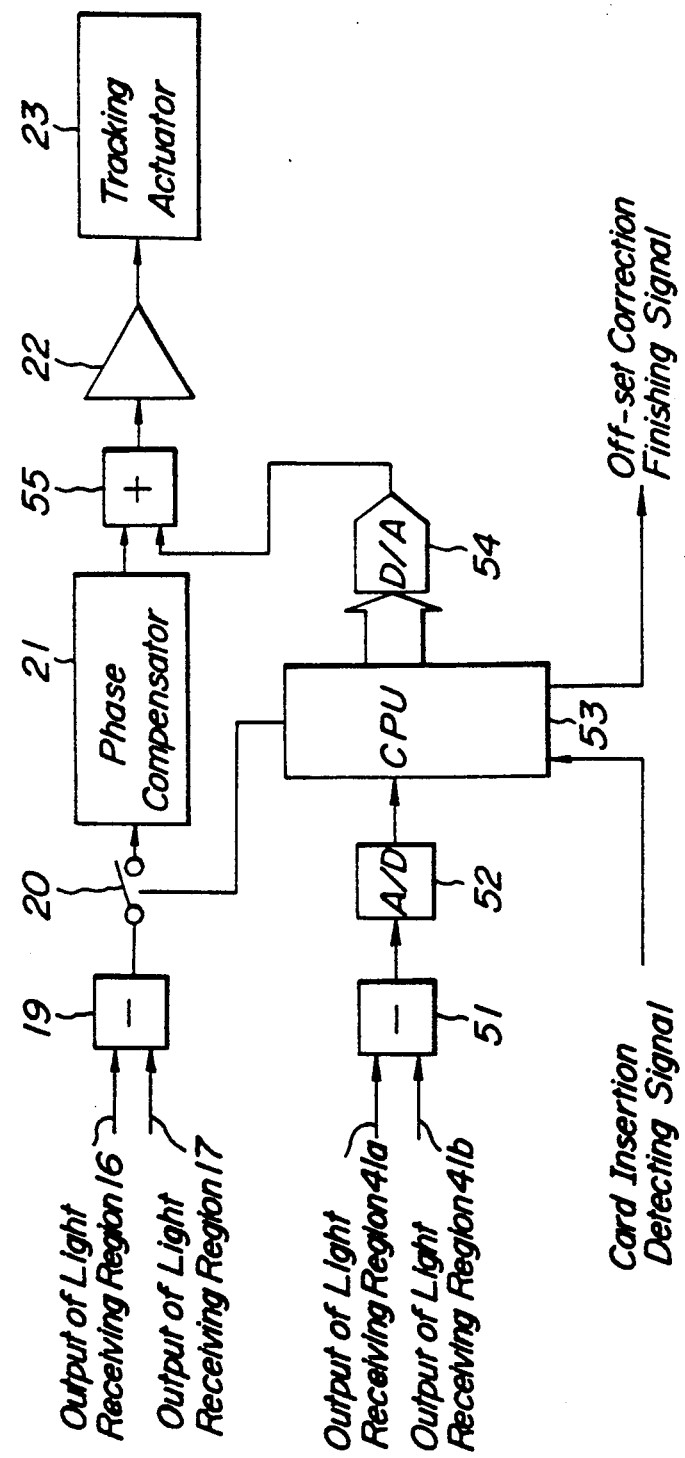

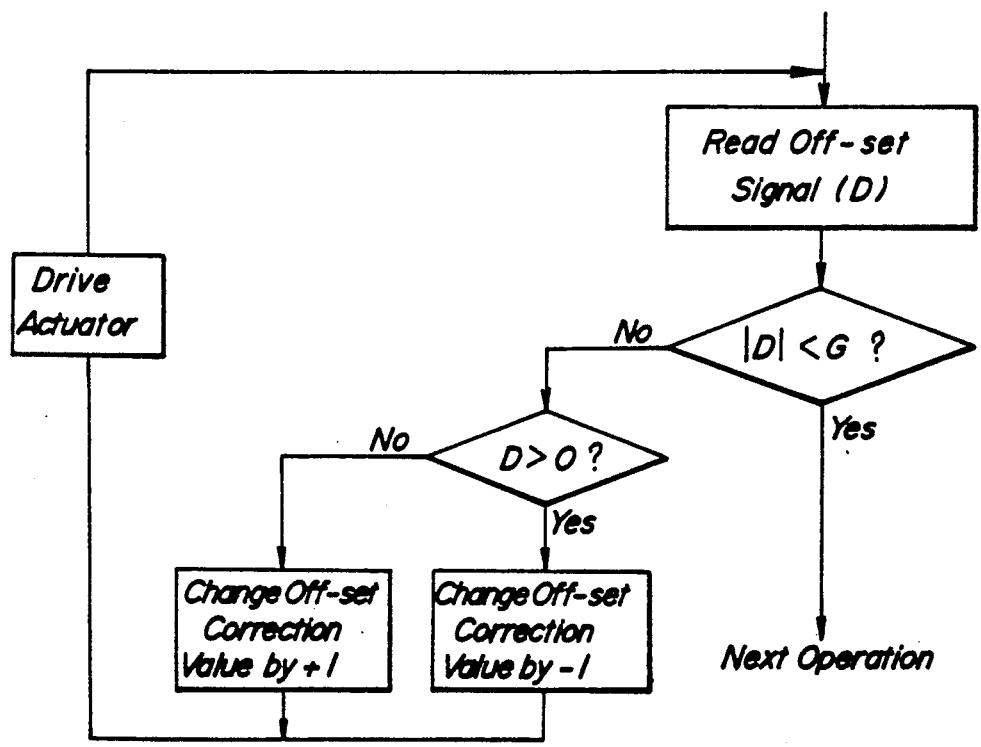
FIG_12

OPTICAL INFORMATION RECORDING/REPRODUCING APPARATUS WITH TRACKING OFF-SET CORRECTION

BACKGROUND OF THE INVENTION

1. Field of the Invention

The present invention relates to an optical information recording/reproducing apparatus in which optical information is recorded on and/or reproduced from an optical information recording medium by illuminating light beams on optical tracks formed on the optical information recording medium via an objective lens. The invention particularly relates to an apparatus having an objective lens position sensor; and an offset of a tracking error signal can be effectively removed on the basis of an output of the objective lens position sensor.

2. Prior Art Statement

Optical discs and optical cards have been suggested as optical information recording media. FIG. 1 is a schematic view showing one example of a construction of the optical card. The optical card 1 comprises a data record region 2 on which optical information is recorded. FIG. 2 is a schematic view showing one part of the data record region 2 formed on the optical card 1. On the data record region 2, are formed a plurality of guide tracks 4, and data tracks 3 are formed therebetween. It should be noted that the tracks 3 and 4 are formed to be parallel to each other; and optical information data is recorded on the data tracks 3.

While, in the optical information recording/reproducing apparatus, for instance, optical information is recorded on and/or reproduced from the optical information recording medium in such a manner that the optical information recording medium is moved in a tracking direction, which is parallel with the extending direction of the tracks, while light beams for recording and reading optical information are made incident upon the tracks via an objective lens. In such apparatus, as well known, focusing and tracking error signals for correcting the position of the objective lens with respect to the optical information recording medium are produced on the basis of reflection light beams reflected by the optical recording medium; and in order to let the light beams follow the tracks in a focus condition, a focusing servo operation is conducted such that the objective lens is moved in a direction (focusing direction F), which is parallel to the optical axis thereof, by a focusing actuator to which said focusing error signal is supplied, and a tracking servo operation is conducted such that the objective lens is driven in a direction (focusing direction D), which is perpendicular to the optical axis thereof and the track direction, on the basis of the tracking error signal.

FIG. 3 is a schematic view showing one example of a construction of an optical system used in the optical information recording/reproducing apparatus. In this apparatus, the focusing error is detected by the off-axis method and the tracking error by the triplicated beam method. In FIG. 3, a light beam emitted from a semiconductor laser 5 is changed into a parallel light beam by a collimator lens 6; the parallel light beam is separated into three light beams by a diffraction grating 7; and the three light beams are made incident upon the information recording region 2 of the optical card 1 via an objective lens 8. As clear from FIG. 3, the light beams do not travel on an optical axis of the objective lens 8.

FIG. 4 is a schematic view showing light beam spots of the three light beams formed on the tracks on the optical card 1. The light beam spots are formed on the tracks in such a manner that a main beam 9a, which is for recording and/or reproducing optical information, follows a center portion of the data track 3; and sub-beams 10a, 11a, which are for detecting the tracking error signal, follow inner edge portions of guide tracks 4,4, in an even manner, respectively. Reflection light beams corresponding to these three beams 9a, 10a and 11a are made incident upon a photo detector 14 via the objective lens 8, a reflection mirror 12 and a lens 13; and then information data signal and error signals are detected by the photodetector 14.

FIG. 5 is a schematic view illustrating light receiving regions of the photo detector 14. The photo detector 14 comprises three light receiving elements 15, 16 and 17. A center element 15 of the light receiving regions is for receiving the reflection light beam 9b of the main beam 9a; and the center light receiving element 15 is further divided into two light receiving regions 15a and 15b. The other side light receiving elements 16 and 17 are for receiving the reflection light beams 10b and 11b of the sub-beams 10a and 11a. The reflection light beams 9b, 10b and 11b being made incident upon the photo detector 14, are moved in a direction shown by an arrow, which is perpendicular to a divisional line of the center light receiving element 15, in accordance with a variation of a relative positional relationship in a focusing direction between the optical card 1 and the objective lens 8. Therefore, a ratio of light amount between the light receiving regions 15a and 15b is varied in accordance with the movement of the reflection light beam 9b, which is moved in the direction shown by the arrow. Additionally, when a relative positional relationship between the optical card 1 and the objective lens 8 in a tracking direction T is varied, the light amounts of the reflection light beams 10b, 11b, which are made incident upon the light receiving regions 16 and 17, are varied.

In the conventional apparatus, the outputs of the light receiving regions 15a and 15b are supplied to a differential amplifier 18 to detect a difference there between, i.e. a focusing error signal, as shown in FIG. 6. When the relative position of the optical card 1 and the objective lens 8 is in a focusing condition, the difference between the outputs of the light receiving regions 15a and 15b becomes zero; thus, it is possible to obtain a focusing error signal, whose polarity is converted in accordance with a direction of the relative position between the optical card 1 and the objective lens 8, from the difference. The thus obtained focusing error signal is supplied to a focusing actuator, which is for driving the objective lens 8 in the focusing direction F, in order to conduct the focus servo control operation.

On the other hand, as shown in FIG. 7, the outputs of the light receiving regions 16 and 17 are supplied into a differential amplifier 19 to detect a difference therebetween. When, the sub-beams 10a and 10b are made incident upon the the guide tracks 4 in an on-track condition, the difference becomes zero. Therefore, a tracking error signal, whose polarity is converted in accordance with the direction that the sub-beams 10a and 10b are deviated from the guide tracks 4, can be obtained from the difference. The thus obtained tracking error signal is supplied to a tracking actuator 23, by which the objective lens 8 is driven in the tracking direction T, via a switch 20, a phase compensator 21 and a driving amplifier 22 in order to carry out the tracking servo control operation.

FIG. 8 is a perspective view depicting an example of a construction of an example of an objective lens driving device, by which the objective lens 8 is driven in the focusing direction F and the tracking direction T. A lens holder 31 is supported on a fixing member 35 to be movable in the focusing and tracking directions by means of a pair of leaf springs 32a, 32b, which are for driving the objective lens 8 in the focusing direction, an intermediate supporting member 33, and a pair of leaf springs 34a, 34b, which are for driving the objective lens 8 in the tracking direction. On both side surfaces of the lens holder 31 in the tracking direction T, are provided focusing coils 36a, 36a, to which the focusing error signal is supplied, and tracking coils 36b, 36b, to which the tracking error signal is supplied, respectively. Further, on the fixing member 35, is arranged a pair of magnetic field generating members 37a, 37b, which comprise permanent magnets for driving the objective lens 8 in the focusing direction F and the tracking direction T in conjunction with said focusing coils 36a and said tracking coils 36b.

Furthermore, there is provided a mirror 38 on an end surface of the lens holder 31. It should be noted that the mirror 38 is arranged in a plane which is determined by the focusing and tracking directions. While, on the fixing member 35 are provided a light source 40 and a photodetector 41 via a supporting member 39 in such a manner that a light beam emitted from the light source 40 is made incident upon the mirror 38 and the reflection light beam is received in the photo detector 41, as shown in FIG. 9A. The photo detector 41 comprises light receiving element 41 which is divided into two regions 41a and 41b, as shown in FIG. 9B. The photo detector 41 is arranged such that when the lens holder 31, i.e. objective lens 8, is positioned in a reference position in the tracking direction T, the reflection light beam reflected by the mirror 38 is made incident upon the light receiving regions 41a and 41b in an even manner; while when the objective lens 8 is moved and deviated from the reference position in the tracking direction T, the ratio of the light amount of the reflecting light beam being made incident upon the light receiving regions 41a and 41b is varied in accordance with the movement of the objective lens 8 in the tracking direction T. To this end, a difference between outputs of the light receiving regions 41a and 41b, i.e. an off-set of the objective lens 8 from the reference position in the tracking direction T, is detected. FIG. 10 is a graph showing a variation of the off-set signal, which is varied in accordance with the movement of the objective lens 8 in the tracking direction T.

In Japanese Preliminarily Patent Publication No. 1-201831, is disclosed a method for detecting the fact that the laser beam cannot trace the track correctly on the basis of the off-set signal; and in Japanese Patent Publication No. 62-15933, is disclosed a technique for detecting whether the objective lens is stopped in a static manner after a desired track is sought in accordance with the off-set signal.

In the conventional optical information recording/reproducing apparatus explained in the above, when the apparatus is set in a horizontal manner, a neutral position of the objective lens 8 is coincident with the reference position in its driving range in the tracking direction T. It should be noted that the neutral position means a position at which the objective lens is positioned when the tracking servo loop of the apparatus is opened. However, the apparatus is sometimes set in an inclined manner actually. When the apparatus is set in an inclined manner, the neutral position of the objective lens 8 is deviated from the reference position. That is to say, a half of the driving range of the objective lens 8 in the tracking direction T becomes small, so that there would occur problems such as an off-set of the tracking error signal and a decrease of a sensitivity of the tracking error signal; and then the tracking servo operation could not be conducted in a stable manner At the worst, the objective lens 8 is moved over the driving range thereof, so that the tracking servo operation could not be conducted at all. Furthermore, it would be impossible to detect the fact on the basis of the off-set signal that the light beam is out of the desired tracks and to detect the fact that the objective lens 8 is stopped in a stable manner after the desired track is sought, due to the non-linear off-set signal.

SUMMARY OF THE INVENTION

The present invention has for its object to provide an optical information recording/detecting apparatus in which the tracking servo operation and other desired operations on the basis of the off-set signal can always be conducted in a stable manner even if the apparatus is set in an inclined manner.

In order to carry out the above mentioned object, an optical information recording and/or reproducing apparatus, in which optical information is recorded on and/or reproduced from an optical information recording medium by illuminating light beams on said medium via an objective lens, comprises:

tracking error detecting means for generating a tracking error signal which is for said light beams to follow tracks formed on said optical information recording medium;

off-set detecting means for detecting an off-set of a neutral position of said objective lens from a reference position in a driving range of the objective lens in a tracking direction to produce an off-set signal, said neutral position being a position at which said objective lens is positioned when a tracking servo loop is opened;

controlling means for receiving said off-set signal and for producing an off-set correction signal for minimizing said off-set;

adding means for adding said tracking error signal and said off-set correction signal to generate an objective lens driving signal; and driving means for driving said objective lens in the tracking direction in accordance with said objective lens driving signal.

BRIEF DESCRIPTION OF THE DRAWINGS

FIG. 1 is a schematic view showing a construction of an optical card, which is used as an information recording medium in the optical information recording/detecting apparatus;

FIG. 2 is an enlarged-scale schematic view depicting a construction of data tracks and guide tracks formed on the optical card in an enlarged scale;

FIG. 3 is a schematic view illustrating a whole construction of an optical system, which is used in the optical information recording/detecting apparatus;

FIG. 4 is a schematic view representing relative positions of beams spots, formed on the data track and the guide tracks on the optical card;

FIG. 5 is a schematic view showing a construction of the light receiving regions of the photo detector provided in the apparatus;

FIGS. 9A and 9B are schematic views showing one part of the objective lens driving device shown in FIG. 8;

FIG. 10 is a graph depicting a relationship between the objective lens position and an off-set signal;

FIG. 11 is a block diagram illustrating a main construction of one embodiment of the apparatus according to the present invention; and FIG. 12 is a flow chart representing an operation being conducted in the apparatus illustrated in FIG. 11.

DETAILED EXPLANATION OF THE PREFERRED EMBODIMENT

Figure 8:
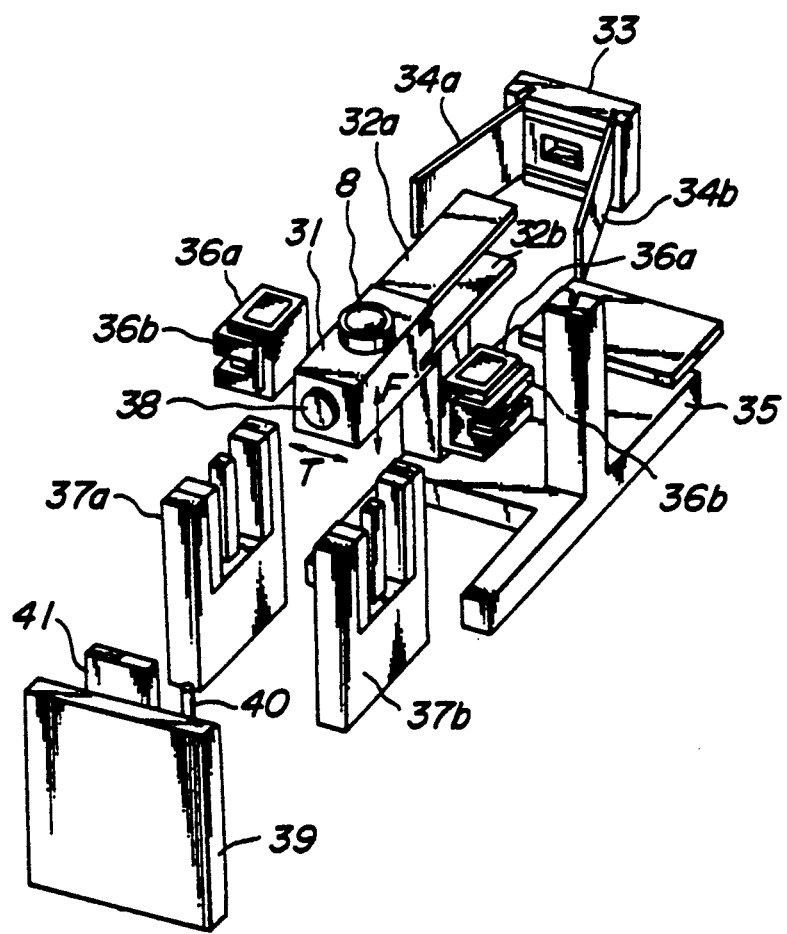
FIG. 8 is a schematic view representing a construction of the driving device for driving the objective lens in the focusing and tracking directions.

FIG. 11 is a block diagram showing a main construction of an embodiment of the apparatus according to the invention. In this embodiment, the objective lens is driven by the device shown in FIG. 8, and the optical system shown in FIG. 3.is used. Therefore, the explanation for the objective lens driving device and the optical system is omitted.

Figure 6:
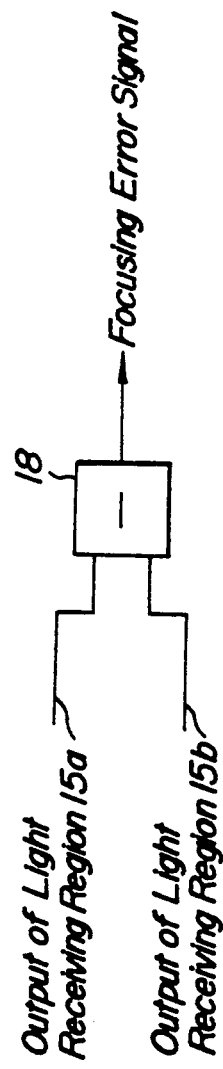
FIG. 6 is a block diagram depicting a main construction of a focusing error detecting device in the conventional apparatus.
Figure 7:
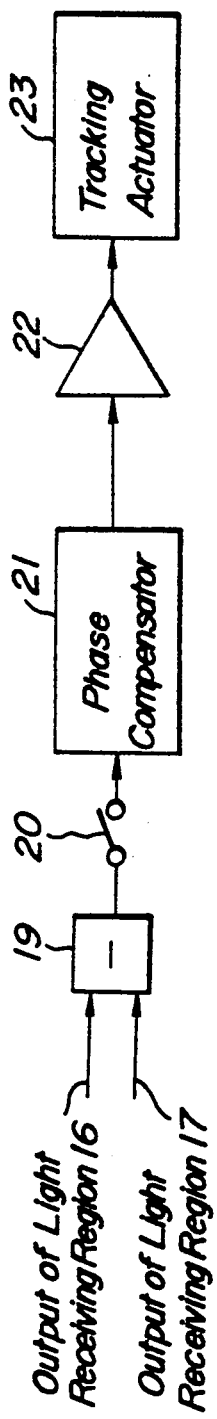
FIG. 7 is a block diagram illustrating a main construction of tracking error detecting in the conventional apparatus.

The outputs of the light receiving regions 41a, 41b of the photo detector 41 are supplied to a differential amplifier 51 to obtain a difference therebetween, i.e. an off-set of the neutral position of the objective lens 8 from the reference position; the output of the differential amplifier 51 is supplied to an A/D converter 52 to convert the output into a digital signal; the digital signal is further supplied to a calculation control device (CPU) 53, in which the off-set amount of the neutral position of the objective lens 8 from the reference position in the tracking direction T is detected to produce an off-set correction signal in accordance with the off-set amount; the off-set correction signal is supplied to one of terminals of an adder 55, which is arranged in the tracking servo system to supply the off-set correction signal to the tracking actuator 23, via a D/A converter 54. To the other terminal of the adder 55, is supplied an output of the phase compensator 21, which has been explained in the above (FIG. 7). The output of the adder 55 is supplied to the tracking actuator 23 via the driving amplifier 22.

The operational function of the device shown in FIG. 11 will be explained, referring to a flow chart shown in FIG. 12.

First, after the insertion of the optical card 1 inserted into the apparatus is detected by the CPU in accordance with a card insertion detecting signal, the switch 20 is made under the control of the CPU 53 OFF to open the tracking servo loop; the output of the A/D convertor 52, i.e. a digital value D of the off-set signal, which is obtained in the differential amplifier 51, is supplied to the CPU 53. In the CPU 53, it is judged whether an absolute value D of the digital value D is larger than a given value G; when the absolute value |D| is larger than the given value G, a plus one (+1) or minus one (−1) is supplied to the D/A converter 54 to correct the digital value D in accordance with the polarity of the original digital value D. Such operation is repeated until the absolute value |D| becomes smaller than the given value G to correct the off-set of the neutral position of the objective lens 8 from the reference position.

After the correcting operation of the digital value D is finished, the switch 20 is closed to close the tracking servo loop, and an off-set correction finishing signal is produced in the CPU 53, and then the next operation is started in accordance with the signal After the switch 20 is closed, the output of the D/A converter 54 and the tracking error signal supplied from the phase compensator 21 are superimposed in the adder 55; and the output of the adder 55 is supplied to the tracking actuator 23 via the driving amplifier 22 to carry out the tracking servo operation for driving the objective lens 8 in the tracking direction T.

The correcting operation for correcting the off-set of the neutral position of the objective lens 8 from the reference position under the condition that the tracking servo loop is open may be conducted after the optical card 1 is inserted into the apparatus, or every time after an electric power is supplied to the apparatus, or at every predetermined time period.

As stated in the above, in the present invention, since the off-set of the neutral position of the objective lens 8 from the reference position is corrected on the basis of the difference between the outputs of the light receiving regions 41a and 41b of the photodetector 41, which is for detecting the position of the objective lens in the tracking direction T, if the apparatus is set in an inclined manner, the range at which the objective lens 8 is moved can be set in an even manner to both directions in the tracking direction T. Therefore, it is possible to effectively prevent a decrease the sensitivity of the tracking error signal and a generation of an off-set in the tracking error signal. To this end, the tracking servo operation can be always conducted in a stable manner. Further, since a linear off-set signal can be always obtained, the detection operations for detecting that the light beam does not trace the desired track and for detecting that the objective lens 8 is stopped after the desired track is sought, on the basis of the off-set signal, can be always conducted in a stable manner.

The present invention is not limited to the above mentioned embodiment, but variations and alternations can be applied thereto. For instance, in the above explained embodiment, the optical card is used as an information recording medium; however, the present invention can be applied to an apparatus for an optical disc. Additionally, the detection method for detecting the tracking and focusing error signals is not limited to the above mentioned method, but another known method can be applied.

What is claimed is:

1. An optical information recording and/or reproducing apparatus, in which optical information is recorded on and/or reproduced from an optical information recording medium by illuminating light beams on said medium via an objective lens, comprising:
    tracking error detecting means for generating a tracking error signal which is used in controlling said light beams to follow tracks formed on said optical information recording medium;

driving means for driving said objective lens in a tracking direction, said driving means comprising a tracking servo loop and a switch means for opening and closing said tracking servo loop in response to a control signal;

controlling means for providing said control signal to said switch means;

off-set detecting means for detecting an off-set of a neutral position of said objective lens from a reference position in a driving range of the objective lens in said tracking direction to produce an off-set signal, said neutral position being a position at which said objective lens is positioned when said tracking servo loop is opened, said controlling means receiving said off-set signal and producing an off-set correction signal for minimizing said off-set; and adding means for adding, when said tracking servo loop is closed, said tracking error signal and said off-set correction signal to generate an objective lens driving signal and for supplying said objective lens driving signal to said driving means, whereby said driving means drives said objective lens in the tracking direction in accordance with said objective lens driving signal.

2. An apparatus according to claim 1, wherein:

said off-set detecting means comprises a light source, a reflection mirror; which is arranged on a lens holder for holding said objective lens, for reflecting a light beam emitted from said light source; a photo detector, which comprises first and second light receiving regions for detecting reflection light beams reflected by said reflection mirror, and a differential amplifier for detecting a difference between the outputs of first and second light receiving regions to produce said off-set signal.

3. An apparatus according to claim 1, wherein:

said controlling means comprises an A/D converter for converting said off-set signal into a digital value D, a central processing unit in which whether an absolute value $|D|$ of said off-set signal is larger than a predetermined value G is judged to calculate an off-set correction value; and said objective lens is driven in accordance with said off-set correction value until the absolute value $|D|$ becomes smaller than the predetermined value G; and when the absolute value $|D|$ becomes smaller than the predetermined value G the tracking servo loop is closed to superimpose said tracking error signal on the off-set correcting signal in said adding means.

4. An apparatus according to claim 3, wherein:

said tracking error detecting means comprises a switching means for opening and closing said tracking servo loop in response to a signal from said central processing unit.

5. An apparatus according to claim 3, wherein:

said central processing unit performs an off-set correcting operation every time when said optical information recording medium is inserted in the apparatus.

6. An apparatus according to claim 3, wherein:

said central processing unit performs an off-set correcting operation every time when an electric power is supplied to said apparatus.

7. An apparatus according to claim 3, wherein:

said central processing unit performs an off-set correcting operation every predetermined time period.

* * * * *